US011670194B2

(12) United States Patent
Sanchez et al.

(10) Patent No.: US 11,670,194 B2
(45) Date of Patent: Jun. 6, 2023

(54) VARIABLE PATTERN SHIELD PROTECTION SYSTEM FOR A TAMPER-EVIDENT CONTAINER

(71) Applicant: Shamrock Supply Company, Inc., Anaheim, CA (US)

(72) Inventors: Jorge Sanchez, Poway, CA (US); Carol E. Fuller, Santee, CA (US)

(73) Assignee: Shamrock Supply Company, Inc., Anaheim, CA (US)

(*) Notice: Subject to any disclaimer, the term of this patent is extended or adjusted under 35 U.S.C. 154(b) by 0 days.

(21) Appl. No.: 17/538,846

(22) Filed: Nov. 30, 2021

(65) Prior Publication Data

US 2022/0335861 A1  Oct. 20, 2022

Related U.S. Application Data

(63) Continuation of application No. 16/840,185, filed on Apr. 3, 2020, now abandoned.
(Continued)

(51) Int. Cl.
*G09F 3/03* (2006.01)
*H04L 9/32* (2006.01)
*G09F 3/02* (2006.01)

(52) U.S. Cl.
CPC .......... *G09F 3/0376* (2013.01); *G09F 3/0335* (2013.01); *H04L 9/3247* (2013.01);
(Continued)

(58) Field of Classification Search
CPC . C08F 210/06; C08F 10/06; G06K 19/07798; G06K 19/073; G06K 19/0709;
(Continued)

(56) References Cited

U.S. PATENT DOCUMENTS 6,478,229 B1   11/2002  Epstein
7,712,674 B1   5/2010   Warner
(Continued)

OTHER PUBLICATIONS

PCT Search Report and Written Opinion (PCT/IB2020/053235), dated Jun. 30, 2020, 18 pages.

*Primary Examiner* — Mark A Williams
(74) *Attorney, Agent, or Firm* — Knobbe Martens Olson & Bear LLP (57) ABSTRACT

The disclosed embodiments provide a method for tamper-evident shipment or storage of goods. An Electrical Shield pattern is embedded in or printed on a substrate with other electrical, optical, and electronic components, communication components, semiconductors, which are attached or printed on a substrate to form a shipment bag used as a shipping container. The shield pattern can be made variable between different bags by using algorithms entered into a printer control system. The shipment bag with its components can then be assigned a unique signature which differentiates each bag. Application of encryption methods serves to guarantee the shipped goods are authentic and that were not tampered with during shipment. Digital signal processing is used to generate pedigree information, which may include items such as shipping location, serial numbers, sensor information, and lot numbers for the goods. The information related to the history of tampering attempts and other sensor status can be placed in encrypted form in an RFID tags or control or monitoring electronics which can be read by a mobile phone application or sent to a remote cloud-based server.

20 Claims, 6 Drawing Sheets

Related U.S. Application Data (60) Provisional application No. 62/829,577, filed on Apr. 4, 2019.

(52) U.S. Cl.
CPC .... *H04L 9/3263* (2013.01); *G09F 2003/0216* (2013.01); *G09F 2003/0248* (2013.01); *G09F 2003/0277* (2013.01)

(58) Field of Classification Search
CPC ....... G06K 19/07372; G06K 19/07737; G06K 19/0776; G08B 25/009; G08B 25/10; G08B 13/06; G08B 13/2434; G08B 29/046; G08B 13/00; G08B 13/128; G08B 13/1454; G08B 13/2417; G08B 13/2431; G08B 17/02; G09F 3/0317; G09F 3/0329; G09F 3/0335; G09F 3/0292; G09F 2003/0216; G09F 2003/0277; G09F 3/00; G09F 3/03; C09J 123/14; C09J 2203/338; B65D 2203/10; B65D 2211/00; B65D 2401/00; B65D 27/30; B65D 33/34; E05B 39/005; E05B 39/02; E05B 45/06; E05B 73/0017; Y10T 292/48; Y10T 292/51; Y10T 292/507; Y10T 29/49018; Y10T 403/11; Y10T 436/13; Y10T 70/8081; Y10T 70/8216; G06F 21/86; G06F 16/909; G06F 21/35
See application file for complete search history.

(56) References Cited

U.S. PATENT DOCUMENTS

| | | | |
|---|---|---|---|
| 9,697,711 | B2 | 7/2017 | McIntosh |
| 10,593,178 | B2 | 3/2020 | Zhang |
| 10,618,712 | B2 | 4/2020 | Goretti |
| 2003/0009683 | A1 | 1/2003 | Schwenck et al. |
| 2004/0025657 | A1 | 2/2004 | Hosoi |
| 2004/0251298 | A1 | 12/2004 | Sih |
| 2005/0184871 | A1* | 8/2005 | Coste ............ B65D 5/4212 340/568.2 |
| 2005/0225445 | A1 | 10/2005 | Petersen et al. |
| 2006/0145870 | A1 | 7/2006 | Coveley |
| 2008/0036598 | A1 | 2/2008 | Oggioni |
| 2009/0295581 | A1* | 12/2009 | Paananen .......... G08B 13/1436 340/572.1 |
| 2014/0028335 | A1 | 1/2014 | Salle et al. |
| 2016/0307381 | A1 | 10/2016 | Siebels |
| 2017/0024989 | A1 | 1/2017 | Coveley |
| 2017/0217655 | A1 | 8/2017 | Hutt et al. |
| 2018/0032759 | A1 | 2/2018 | Radocchia |
| 2018/0297778 | A1 | 10/2018 | Widitora |
| 2018/0317314 | A1 | 11/2018 | Olberding et al. |

* cited by examiner

VARIABLE PATTERN SHIELD PROTECTION SYSTEM FOR A TAMPER-EVIDENT CONTAINER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. application Ser. No. 16/840,185, filed Apr. 3, 2020, titled "VARIABLE PATTERN SHIELD PROTECTION FOR A TAMPER-EVIDENT CONTAINER," which claims the benefit of U.S. Provisional Application Ser. No. 62/829,577, filed Apr. 4, 2019, titled "ELECTRICAL SHIELD PROTECTION FOR A TAMPER-PROOF CONTAINER," which is incorporated by reference herein in its entirety and for all purposes.

BACKGROUND

Field

The presently disclosed embodiments relate to the prevention and identification of tampering of a container of goods. This is done in order to prevent substitution of counterfeit products instead of the legitimate goods, and to identify potential product contamination, or to prevent access to secured articles, or to discourage theft and unauthorized access in general.

Description of the Related Art

Shipping containers used in transportation of goods are vulnerable to intrusion. Containers can be compromised when they are illegally removed from holding yards, or breached during the shipping process, or when they are in secured cages or other forms of storage. An emerging issue is a breach of the container through its walls or shipping package rather than through the container doors or openings.

Globalization of product manufacturing has brought a significant challenge to consumers, in the sense that many products are substituted by counterfeits during and after manufacture, throughout portions of the supply chain, and especially while in-transit. As an example, some of these products can be pharmaceuticals, wine, documents, and jewelry or secured biological products. Consequences of illegal access to containers can cause financial losses, harm the health of users of the products, or cause a loss of valuable information. When counterfeit products do not perform as intended, they can jeopardize national security. Counterfeiters attack the supply chains used for any and all manufactured goods, for example, electronic parts, costly mechanical parts, expensive perfumes and cosmetics, and medicines. Some of the worst examples include counterfeit medicines, which can be substituted with chemicals with life threatening consequences; fastening bolts used in critical locations such as bridges and aircraft; fire extinguishers containing compressed air which cannot perform in urgent situations; and electronic parts that are installed in national defense systems which reduce reliability, security, and performance.

Present solutions include the utilization of Radio Frequency Identification (RFID) tags. These tags are devices that are attached to the products or shipping container. They contain an identification code and in some cases manufacturing information about the part. During shipment and at different locations of the supply chain, the RFID tags are scanned by equipment that applies near field radio frequencies to the RFID tag and reads the identity of the part to determine if the tag will return the correct information. If this is the case, then the product is understood to be on track for the shipping process.

However, the present use of RFID tags has significant weaknesses. When used in a box or package containing products, the tags used only ensure the box or package is the same as the tag used at shipment but does not guarantee the authenticity of the contents in the shipping container. The box or package contents can be counterfeit and could have been changed somewhere within the supply chain during transit, at a warehouse, or in the transportation vehicle between supply chain locations. As long as the RFID tag has not been dismantled, damaged, or removed, the package would be perceived as intact.

SUMMARY

Embodiments disclosed herein address the above-stated needs to protect consumers from counterfeit products and for protecting goods during shipment.

Embodiments of the present technology include an arrangement of an Electrical Shield or Electrical Shields that covers all or substantially all sides of the interior of a container of any shape, which can include all interior surfaces such as the bottom, the top, the two sides, and end walls. An Electrical Shield is a pattern embedded on a substrate medium such as woven and non-woven fabrics, paper, cardboard, wood products, rigid plastics, plastic sheets, or foam, and other conformable flexible media. The pattern can be printed using carbon inks, or commonly used conductive inks or a semiconductor material. In addition, there can be various electrical and electronic components mounted on the substrate which when added to the conductive pattern form the Electrical Shield. The resulting combination is a continuous pattern of Electrical Shield that, along with the conformable media and electrical and electronic components will blanket all the container interior walls. The arrangement of the present technology forms what is known as an Electrical Shield.

In other embodiments, the Electrical Shield can include a conductive or semi-conductive pattern printed on a base material which is enclosed with protective layers to form a bag where the material goods to be shipped are placed. The printed Electrical Shield can form a resistance network, a capacitor network, an inductor network, a network with semiconductor or optical components, or a combination of one or more of these elements. The network can contain embedded integrated circuits and patterns with conductive or semi conductive circuits made with silicon integrated circuits and implemented in combination with metal materials. The Electrical Shield can include a printed pattern including any electrical and electronic components and may include a sensor.

The printed pattern used to form the Electrical Shield can be made with various materials that can be a conductor or a semiconductor. There are implementations of a pattern that use conductive materials such as silver or copper. In some embodiments of the present technology, an Electrical Shield implementation utilizes conductive inks or carbon inks for printing a conductive pattern. Carbon inks and conductive inks can be printed on many different media, including plastics or paper to obtain resistances of a few tens of ohms per square. The printed patterns can be measured by conventional electronics. Carbon inks are sufficiently low in cost such that they are practical for use in many high-volume applications, and especially for protection of shipments. Furthermore, these inks can be printed with patterns that insert electronic components, optical components, and conductive materials in order to produce complete circuits. New technologies allow printing, on plastic media, of electrical and electronic components such as capacitors, inductors, batteries, antennas, resistors, sensors for temperature, pressure and humidity, optical components and even semiconductors. For example, humidity sensors can be obtained by printing techniques to add to the solutions presented here. See the following reference titled: "A highly sensitive printed humidity sensor based on a functionalized MWCNT/HEC composite for flexible electronics application", by Vikram S. Turkani, published in the Journal Nanoscale Advances on Issue 6, 2019, https://pubs.rsc.org/en/content/articlepdf/2019/na/c9na00179d, which is incorporated by reference herein. This research article covers the use of carbon nanotubes or graphite to obtain a humidity sensor that can be printed on a substrate. Discrete semiconductor components such as integrated circuits can be added to the Electrical Shield by mounting them with an appropriate adhesive to the substrate. The resulting Electrical Shield can be connected and measured by the integrated circuits to obtain a unique signature. This unique signature can be a digital value which is obtained by a measurement of the shield pattern and the other electrical and electronic components printed in the substrate or in the bag enclosing goods as discrete components. The signature can include various characteristics such as resistance, capacitance, and electronic digital patterns from an embedded semiconductor or an optical component. The resulting signature of the Electrical Shield can be made unique and therefore can be used to authenticate individual container packages to avoid counterfeit packages.

The Electrical Shield can be embedded in wrapper materials to form multiple configurations in order to adapt the Electrical Shield for shipping various types of goods. This arrangement can be done in such a way as to form a shipment bag. The bag in turn can surround the goods to be shipped. Also, the bag with shipment goods can be placed in another external container such as a cardboard box, a case, or on or within a shipping pallet. As described before, the measurement of the Electrical Shield sensor provides a characteristic signature which is unique. The signature of the Electrical Shield sensor is used in combination with a set of electronics and software features to protect the container and identify tampering. If the Electrical Shield is cut, the signature is altered, which will indicate tampering. Patterns of conductive ink or carbon ink can be placed on the material such that the gap between the patterns is sufficiently narrow to prevent intrusion into the container without damage to the shield or without an instantaneous change to the signature characteristics of the shield. The sensed signature can be stored in a set of control electronics or an RFID tag. Other information that can be stored are any attempts of prior openings of the container with the Electrical Shield, and the time when the tampering occurred. Information stored in the control electronics or an RFID tag can be encrypted. The receiving person of the shipping goods can utilize a mobile phone with a custom application to identify the history of the container and the status of the Electrical Shield. A mobile app at the receiving end would use a matching decryption key to securely determine the information stored in the bag.

In a first aspect, an anti-tamper container includes an electrical shield made with a variable conductive pattern having a conductive pattern design on a substrate, the conductive pattern design varying in at least one of form or density; and monitoring electronics in communication with the electrical shield and configured to detect a tampering status of the container based on an electrical signature of the electrical shield.

In some embodiments, the conductive pattern design is variable in density and form. In some embodiments, the conductive pattern design is generated automatically by a process that uses an algorithm. In some embodiments, the conductive pattern design includes one or more traces including conductive ink. In some embodiments, the conductive pattern design includes one or more traces comprising carbon ink. In some embodiments, the conductive pattern design includes one or more electric or electronic circuits placed on insulating material to provide a unique signature. In some embodiments, the electrical shield includes optical components placed on insulating material to provide a unique signature. In some embodiments, the electrical shield further includes one or more printed sensors on the substrate to provide information needed to guarantee quality of shipped goods. In some embodiments, the one or more printed sensors include at least one of a temperature sensor or a humidity sensor. In some embodiments, the monitoring electronics use a programmable shield measurement test time period to extend battery life.

In a second aspect, a method for secure shipment of goods using the anti-tamper container of the first aspect includes placing the goods into the anti-tamper container of the first aspect, causing encryption of the electrical signature based on an encryption key, causing the encrypted electrical signature to be stored in the monitoring electronics of the first container, causing the first container to be transferred to a recipient, and causing a decryption key corresponding to the encryption key to be sent to a computing device associated with the recipient to guarantee authenticity of the goods.

In some embodiments, the decryption key is transferred to the recipient via a remote server. In some embodiments, the decryption key is sent to the recipient automatically based on an initialization of the monitoring electronics by a computing device associated with a sender of the goods.

In a third aspect, a set of anti-tamper containers is described. Each anti-tamper container of the set of anti-tamper containers includes an electrical shield made with a variable conductive pattern having a conductive pattern design on a substrate, the conductive pattern design being different from the conductive pattern design of at least one other anti-tamper container of the set of anti-tamper containers; and monitoring electronics in communication with the electrical shield and configured to detect a tampering status of the container based on an electrical signature of the electrical shield.

In some embodiments, the conductive pattern design is randomly differentiated among the anti-tamper containers using an algorithm.

In a fourth aspect, an anti-tamper mailing bag includes a rectangular substrate folded widthwise about a dividing line and sealed along edges perpendicular to the dividing line to form a bag having an open edge opposite the dividing line; a first flap contiguous with the open edge, the first flap comprising a plurality of first conductive contacts; a plurality of second conductive contacts arranged on an outside of the bag proximate the open edge or on a second flap contiguous with the open edge opposite the first flap, each second conductive contact having substantially the same lateral location and distance from the open edge as a corresponding one of the plurality of first conductive contacts; a plurality of printed traces disposed on the rectangular substrate, each printed trace of the plurality of printed traces electrically connecting one of the first conductive contacts to one of the second conductive contacts other than the second conductive contact corresponding to the one of the first conductive contacts; and an adhesive configured to adhere the first flap to the outside of the bag or the second flap such that each first conductive contact is electrically connected to the corresponding second conductive contact to form a single conductive path around the bag including the plurality of printed traces.

In some embodiments, the anti-tamper mailing bag further includes monitoring electronics electrically connected to at least one of the printed traces. In some embodiments, at least some components of the monitoring electronics are printed onto the substrate or the first flap. In some embodiments, the adhesive comprises a conductive adhesive disposed on the first conductive contacts or on the second conductive contacts. In some embodiments, the conductive adhesive is disposed on both the first conductive contacts and the second conductive contacts.

BRIEF DESCRIPTION OF THE DRAWINGS

The nature, objects, and advantages of the present technology will become more apparent after considering the following detailed description in connection with the accompanying drawings, in which like reference numerals designate like parts throughout.

DETAILED DESCRIPTION

The disclosed embodiments provide systems, devices, and processes for tamper evident security of a shipping container. A package with an Electrical Shield and a process consisting of a test system and digital signal processing software allows a shipping container to be protected on all its sides.

Figure 1:
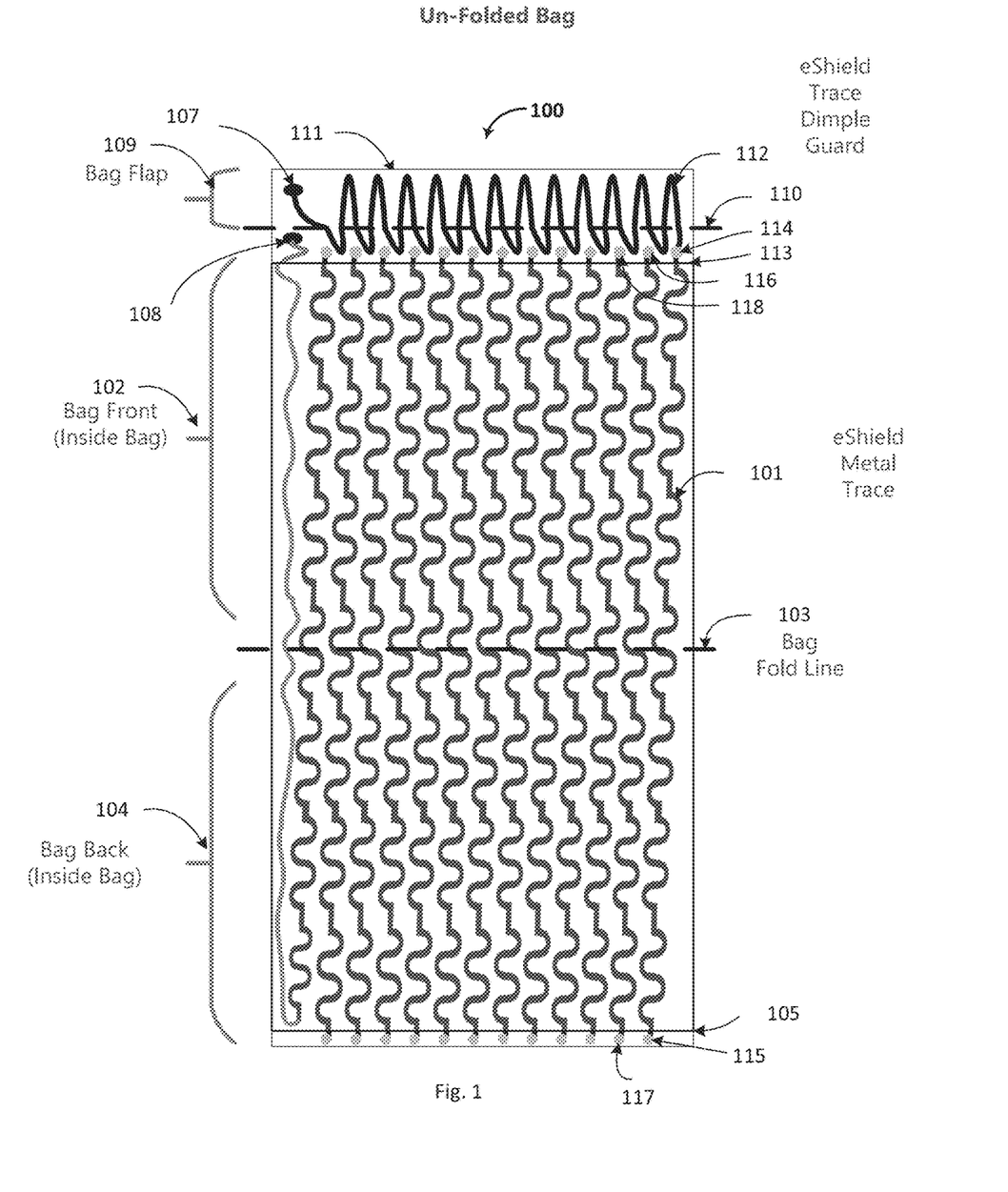
FIG. 1 shows a typical Electrical Shield implemented with strips of conductive material placed on a base of nonconductive material.

FIG. 1 illustrates an example of how the elements of the Electrical Shield are related after the conductive material is printed and before the printed elements are surrounded by a package to form a shipping bag. At 101, the traces of conductive patterns are shown. These patterns are applied on a base of material 111 such as plastic. Patterns can be modified from time to time, can be made denser and with a variety of designs in order to provide protection unexpected by someone trying to tamper with the Electrical Shield. Prior to assembly, at 102 is one side of the Electrical Shield and at 104 is second side of what will be the Electrical Shield. Typically, all the patterns of conductive printed material will be covered with an insulating layer as will be described further. The patterns will be covered once the Electrical Shield is assembled into a bag. At 103 the illustration shows the dividing line where the Electrical Shield will be folded.

The Electrical Shield has a row of conductive contacts such as contact dots in line with dot 114 and a row of dots in line with dot 115 at the opposite ends of the printed pattern. For this discussion, we assume the printed pattern has been covered with a layer of insulating material (not shown) between line 113 and line 105. Also, the dots in the row of dot 114 and the dots in the row of dot 115 have been covered with a conductive adhesive. Therefore, when the Electrical Shield is folded at 103, the Electrical Shield dividing line at dot 113 will align with the line shown at 115. With this type of fold, we can achieve a continuous trace of conductive stripe as follows:

If we start at contact dot 107 we have a direct connection with contact dot 114 via trace 112. Dot 114 in turn connects with contact dot 115 by means of the conductive stripe. Note that the pattern is laid out at an offset angle. Thus, after folding, contact dot 115 connects with contact dot 116. Furthermore, contact dot 116 by means of the conductive pattern will connect with dot 117. Dot 117 will in turn connect with dot 118 after the pattern is folded. As we continue with this sequence, we will end with a connection to contact dot 108. As a result, we will accomplish a continuous circuit starting from contact dot 107 and ending with contact dot 108. This design of the printed pattern thus can achieve a continuous Electrical Shield between 107 and 108.

Figure 2:
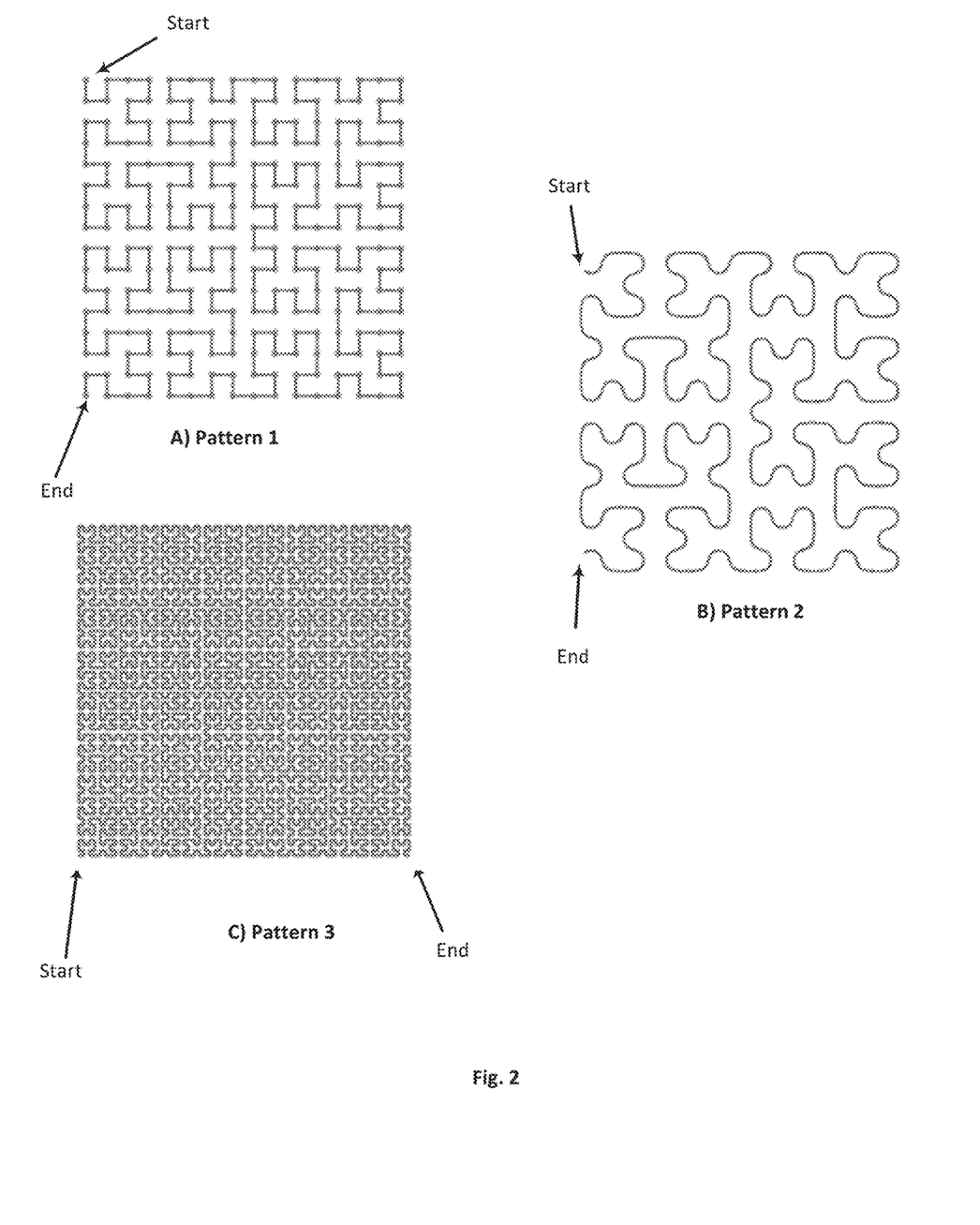
FIG. 2 shows various patterns for an Electrical Shield that allow for unpredictability of the pattern in terms of pattern design and density.

FIG. 2 illustrates several examples of patterns that can be used to achieve an Electrical Shield with a variable Electrical Shield design that is variable in density and form. In this illustration we used what is known as a Hilbert space filling curve which is a fractal algorithm used to fill our space in two dimensions. For an explanation of the Hilbert algorithm (see the following reference: https://en.wikipedia.org/wiki/Hilbert_curve). There are multiple ways in which the Electrical Shield can be generated using an algorithm to advantageously impede the tampering of the shield because the shield pattern on the substrate can be made variable and with different densities. The approach of using algorithms is that the pattern can be changed automatically so that the pattern is random using an algorithm and the data can be inputted into a printer so the patterns can be readily changed. The algorithms can be input into programmable printers so that each individual Electrical Shield or Shields in each production lot can be different and thus achieve the maximum protection against tampering because a pattern for any one shipping bag cannot be predicted. For example, a group of bags in a production lot of bags may have substantially the same external appearance while having different internal Electrical Shield densities or forms such that it is difficult or impossible to predict where the conductive traces are present without cutting into or otherwise tampering with the bag.

Figure 3:
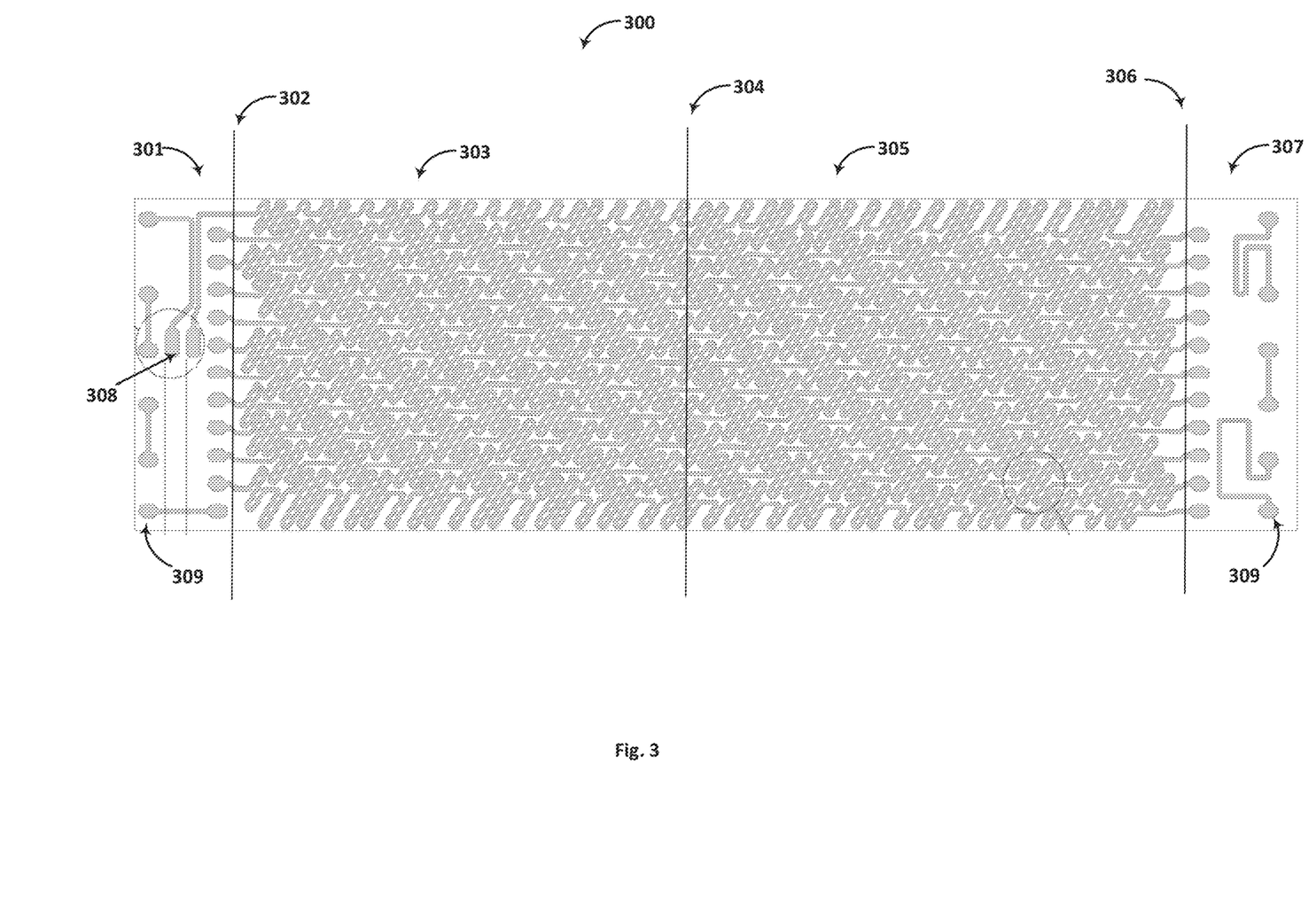
FIG. 3 shows a view of a possible pattern used to implement an Electrical Shield.

FIG. 3 illustrates an embodiment used for a given design of the shield pattern. At 300, the overall design of the shield pattern is shown. This pattern can be made with carbon inks or other conductive material. As described above, multiple other types of additional electrical, optical, and electronic components can be embedded in the pattern, such as in the middle of the pattern. The pattern in FIG. 3 can be placed in an arrangement where the pattern is surrounded on the top and the bottom with insulating layers of plastic or paper material, protective foam, layers of bubble wrap, external package, and shipping labels in order to form a shipping bag. For the purpose of this discussion we will assume the printed pattern of FIG. 3 has been covered with an insulating layer between the dividing line at 302 and the dividing line at 306. Sections 303 and 305 include a conductive pattern that can be variable in density and/or form at different points within the sections 303 and 305. Examples of such variations may include for example, density of traces per unit area of the substrate, or form of the traces (e.g., relative location and spacing of curved, straight, and/or angled sections within an individual trace or between adjacent traces).

Portions of the figure at 301 and 307 show features with circular feature patterns 309. These features are contact points that can maintain a continuous trace for the electrical shield when the completed bag is assembled. In some embodiments, circular dot features 309 will be covered by a conductive adhesive for this purpose. Rectangular pads 308 are used to connect the shield pattern to monitoring electronics. Some of the circular dot features 309 and rectangular features 308 may be covered with an anti-oxidation coating of noble metal or other suitable material. Other shapes and configurations for the features 308 and 309 are possible. Furthermore, sections 301 and 307 may be covered each with a strip of insulating material such as plastic and or wax paper in order to keep the conductive features of the bag from sticking to unwanted surfaces prior to using the bag for shipment of goods.

Figure 4:
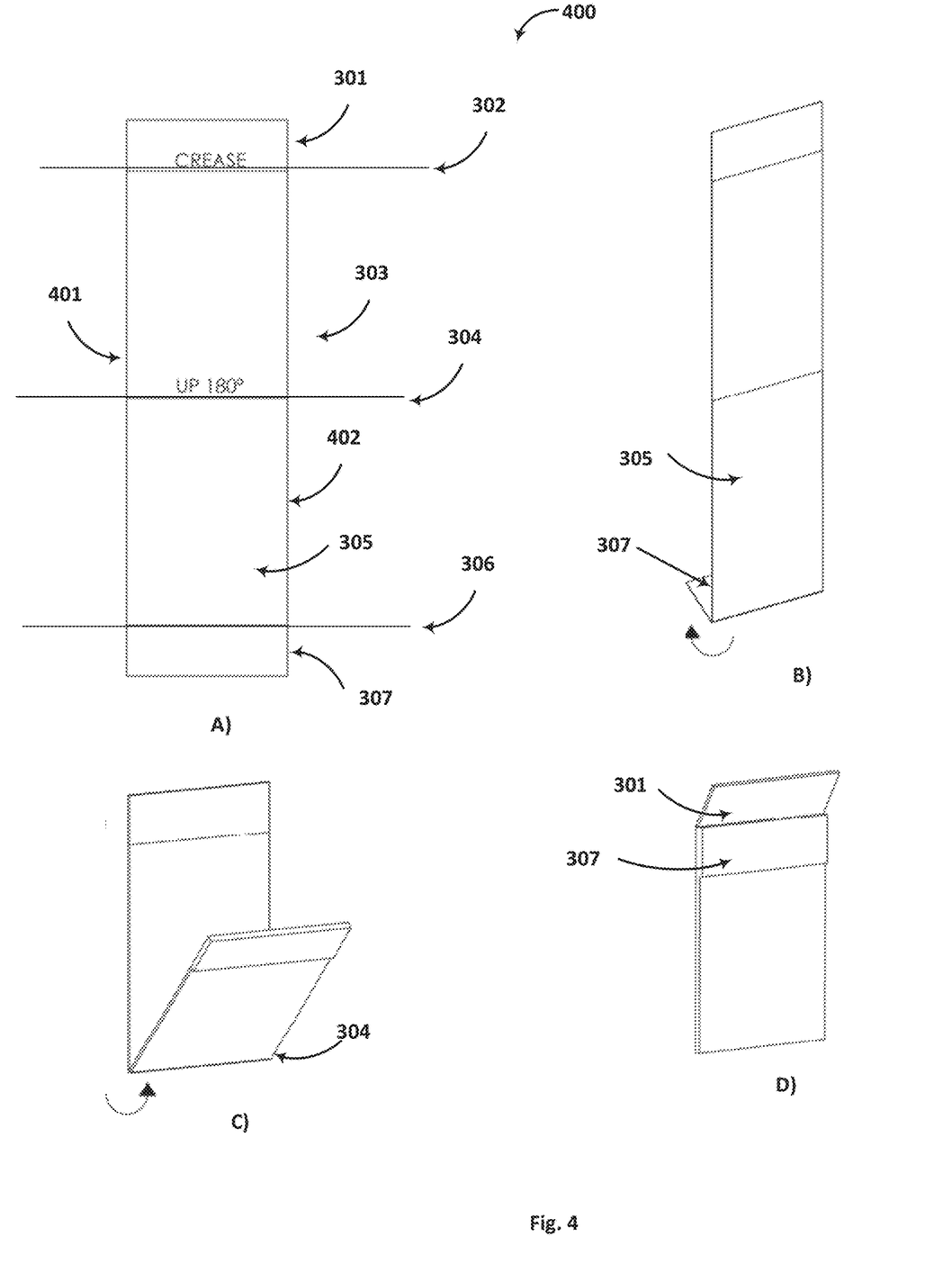
FIG. 4 shows an embodiment of how the material layers can be folded to form a bag with the Electrical Shield.

FIG. 4 illustrates an example process for folding the printed pattern insulating and protective material, labels, electrical, optical, and electronic components, to form a shipping bag. As depicted in step A, the bag will be folded in the middle at dividing line 304. The pattern containing two of the longer sides 401, 402 will be sealed at the edges between sections 302 and 306 using a thermal sealing manufacturing process or a strong adhesive. The center part of the pattern is open and available to place shipping goods. Step B shows how the section 307 is folded to the back of the section 305 with a 180-degree fold. Furthermore, as step C shows, the printed pattern is folded at the dividing line 304 by 180 degrees over section 303. At that point, each of the two longer sides of the bag 401, 402 will be sealed at the edges between sections 302 and 306 with the appropriate sealing method. In some embodiments, the sides of flap 307 may also be sealed to the longer sides 401, 402 at this stage. Step D shows the completed bag ready to receive the shipment goods. After the goods are placed in the bag, flap section 301 is folded over section 302 to seal the bag for shipment. Note that prior to this last step depicted in step D, there can be a tape of insulating material that is peeled off from surfaces 301 and 307 which can be used to uncover the conductive dots 308 and 309.

Figure 5:
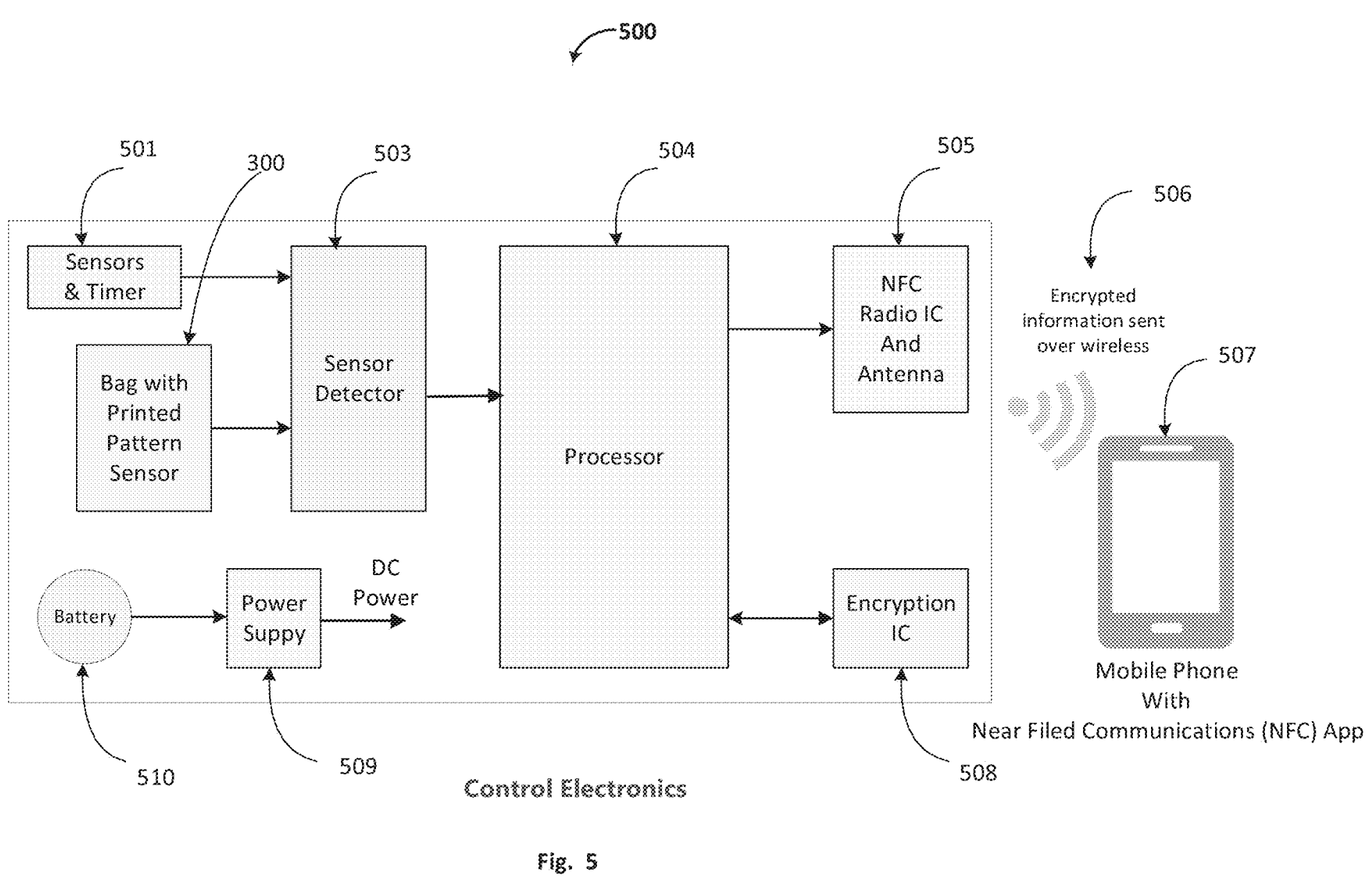
FIG. 5 shows an example system solution and control electronics in accordance with the present technology.

FIG. 5 illustrates example elements of the electronics. At 501 is a set of sensors and timers used to monitor environmental parameters such as temperature, humidity, and shock, which is necessary in order to preserve the quality of material shipped in the bag. For example, if the bag contains medications, then the sensors ensure the medications did not exceed recommended environmental conditions. Another example is when the bag is used to safeguard food materials such as high-priced seafood, where it is important to monitor all conditions of temperature, humidity, and the time since shipment was initiated. The completed bag 300 is connected to a sensor detector 503 which contains signal conditioning electronics such as amplifiers. At 504 is a processor, which is implemented with a microcontroller, an ARM processor, an FPGA, or any other equivalent controller. The processor 504 contains an analog to digital conversion system and the embedded control system firmware. The firmware monitors the bag to record whether it is opened during shipment. In some embodiments, the monitoring electronics may use a programmable shield measurement test time period to extend battery life. For example, the monitoring electronics may be programmed to obtain the signature of the printed pattern in the bag on a periodic basis, such as every minute, every ten minutes, every thirty minutes, every hour, etc., at a predetermined time or times each day, or according to any other suitable periodic or event-based schedule. The firmware in the processor 508 also obtains the signature of the printed pattern in the bag, the status of the sensors and the timer 501 and then encrypts the information. This can be done in firmware or with the assistance of an encryption integrated circuit (IC) 508. The encrypted information is then stored in the control electronics or an NFC tag IC at 505. At 507 a mobile phone or other NFC reader can be used by the receiver of the shipment goods to read the encrypted information 506 that was stored in the control electronics or an NFC tag IC 505. Many elements of this set of electronics can be printed on a substrate using specialized inks. In addition, some components can be placed directly on the substrate with the Electrical Shield pattern as described earlier. The electronic system can also include a GPS, a GPS antenna to detect location during the shipment of goods. Other communication devices such as Wi-Fi and cell, and can be included with service providers for LTE, Sigfox and LORA standards.

Figure 6:
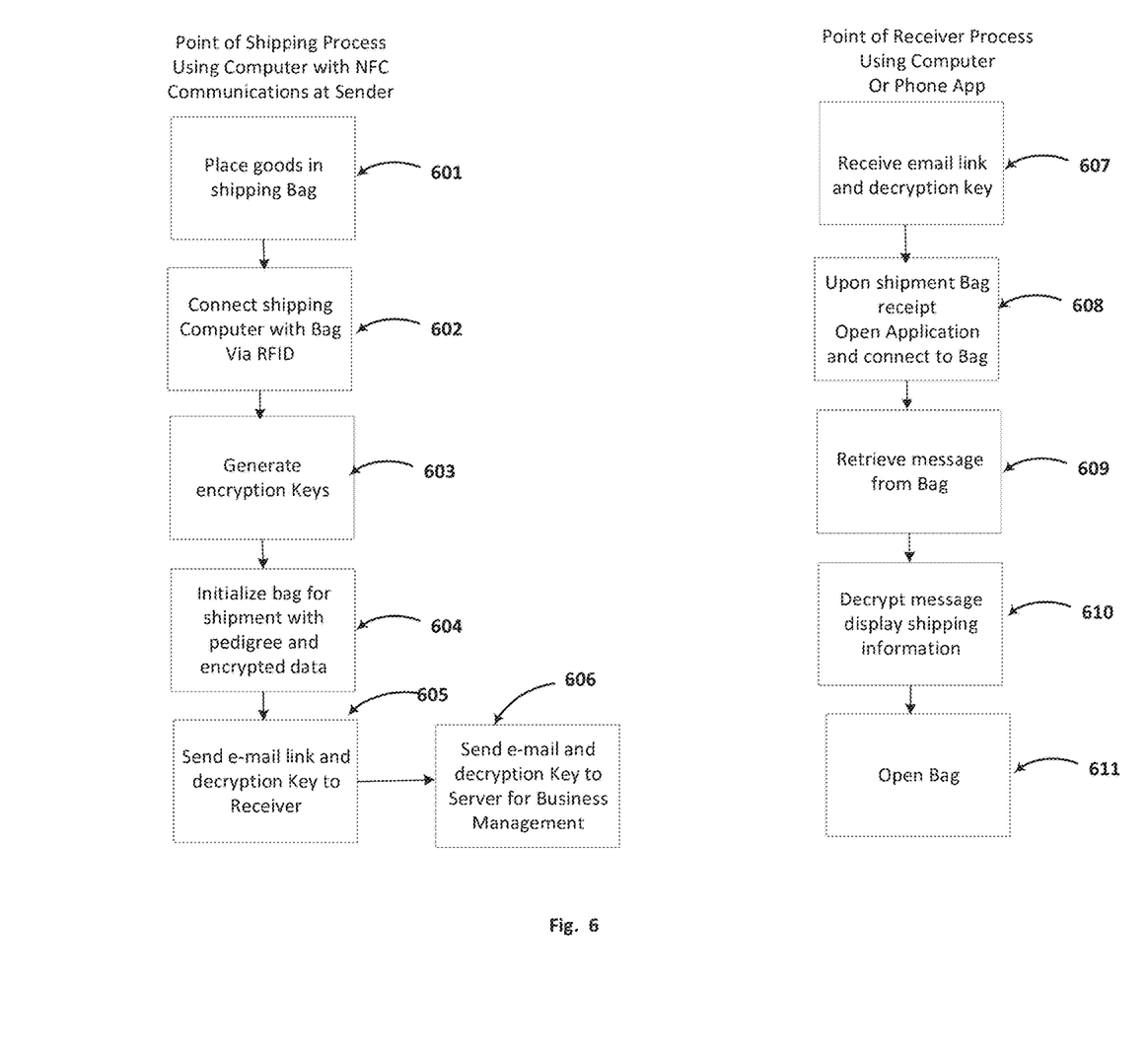
FIG. 6 illustrates example data management processes in accordance with the present technology.

FIG. 6 is an illustration of an example process used to manage the shipment of goods. At 601 the shipper of goods uses the bag as a container for the goods to be shipped. A computer or other computing device is used to connect to the controller in the shipping bag and to initialize the bag. At the point of shipment, the encryption key is stored in the processor 504 along with the signatures and pedigree for the bag. The bag is then closed. At 605, an email and a decryption key are sent to the receiver of the shipment. In addition, for shipment management purposes, the information regarding the shipment is stored in a server.

At the receiver end 607, the receiver of the goods will receive an email and a decryption key. The receiver will typically use a phone app to open an application which allows the receiver to connect to the bag. At 609, the phone app will retrieve a message from the bag containing any tampering data and a signature with the pedigree information. The phone app will decrypt the information and display it for the receiver. At 611, once the receiver confirms the lack of tampering and the status of the goods, the bag can be opened.

As a specific example, in the situation of pharmaceutical shipments, the sender can be a pharmacy at the shipping location. The corresponding decryption key and email will be sent to the phone app in the mobile phone of the individual receiving the shipment of medications. The receiver of the pharmaceuticals can then connect with the bag (e.g., using the phone app and/or an NFC link) to be advised if the bag was opened, how long the transportation took, whether the temperature and humidity range required were not exceeded, etc.

Various modifications to these embodiments, and the generic principles defined herein may be applied to other embodiments without departing from the spirit or scope of the present technology. Thus, the present technology is not intended to be limited to the embodiments shown herein but is to be accorded the widest scope consistent with the principles and novel features disclosed herein.

What is claimed is:
1. An anti-tamper mailing bag comprising:
an electrical shield comprising a conductive pattern design on a substrate of the mailing bag, the conductive pattern design varying in at least one of form or density, wherein the conductive pattern design provides a unique electronically measurable signature based at least in part on the conductive pattern design of the electrical shield; and monitoring electronics in communication with the electrical shield and configured to:
electronically measure the signature of the electrical shield;
store the signature of the electrical shield; and
detect a tampering status of the mailing bag based on a subsequent measurement of the signature of the electrical shield.

2. The anti-tamper mailing bag of claim 1, wherein the conductive pattern design is variable in density and form.

3. The anti-tamper mailing bag of claim 1, wherein the conductive pattern design comprises one or more traces comprising conductive ink.

4. The anti-tamper mailing bag of claim 1, wherein the conductive pattern design comprises one or more traces comprising carbon ink.

5. The anti-tamper mailing bag of claim 1, wherein the electrical shield further comprises one or more electric or electronic circuits in communication with the conductive pattern design such that the signature of the electrical shield of the mailing bag is based at least in part on the one or more electric or electronic circuits.

6. The anti-tamper mailing bag of claim 1, wherein the electrical shield further comprises one or more optical components in communication with the conductive pattern design such that the signature of the electrical shield of the mailing bag is based at least in part on the one or more optical components.

7. The anti-tamper mailing bag of claim 1, wherein the electrical shield further comprises one or more printed sensors on the substrate to provide information needed to guarantee quality of shipped goods.

8. The anti-tamper mailing bag of claim 7, wherein the one or more printed sensors comprise at least one of a temperature sensor or a humidity sensor.

9. The anti-tamper mailing bag of claim 1, wherein the monitoring electronics are configured to measure the signature of the electrical shield on a periodic or event-based schedule after measurement and storage of the signature, according to a programmable shield measurement test time period.

10. A method for secure shipment of goods using the anti-tamper mailing bag of claim 1, the method comprising:
placing the goods into the anti-tamper mailing bag of claim 1;
causing the monitoring electronics to encrypt the signature of the electrical shield based on an encryption key;
causing the monitoring electronics to store the encrypted signature in a memory of the monitoring electronics of the mailing bag;
causing the mailing bag to be transferred to a recipient; and
causing a decryption key corresponding to the encryption key to be sent to a computing device associated with the recipient to guarantee authenticity of the goods.

11. The method of claim 10, wherein the decryption key is transferred to the recipient via a remote server.

12. The method of claim 10, wherein the decryption key is sent to the recipient automatically based on an initialization of the monitoring electronics by a computing device associated with a sender of the goods.

13. A set of anti-tamper mailing bags, each anti-tamper mailing bag of the set of anti-tamper mailing bags comprising:

an electrical shield comprising a conductive pattern design on a substrate of the mailing bag, wherein the conductive pattern design provides a unique electronically measurable signature based at least in part on the conductive pattern design of the electrical shield, the conductive pattern design being different from the conductive pattern design of at least one other anti-tamper mailing bag of the set of anti-tamper mailing bags; and monitoring electronics in communication with the electrical shield and configured to:
electronically measure the signature of the electrical shield;
store the signature of the electrical shield; and
detect a tampering status of the mailing bag based on a subsequent measurement of the signature of the electrical shield.

14. The set of anti-tamper mailing bags of claim 13, wherein the conductive pattern design is randomly differentiated among the anti-tamper mailing bags.

15. An anti-tamper mailing bag comprising:
a rectangular substrate folded widthwise about a dividing line and sealed along edges perpendicular to the dividing line to form a bag having an open edge opposite the dividing line;
a first flap contiguous with the open edge, the first flap comprising a plurality of first conductive contacts;
a plurality of second conductive contacts arranged on an outside of the bag proximate the open edge or on a second flap contiguous with the open edge opposite the first flap, each second conductive contact having substantially the same lateral location and distance from the open edge as a corresponding one of the plurality of first conductive contacts;
a plurality of printed traces disposed on the rectangular substrate, each printed trace of the plurality of printed traces traversing a length of the rectangular substrate across the dividing line and electrically connecting one of the first conductive contacts to one of the second conductive contacts, wherein each first conductive contact is connected to a different one of the plurality of printed traces relative to the printed trace connected to the corresponding second conductive contact; and
an adhesive configured to adhere the first flap to the outside of the bag or the second flap,
wherein the first conductive contacts and the second conductive contacts are positioned such that, when the first flap is adhered to the outside of the bag or the second flap, each first conductive contact physically contacts the corresponding second conductive contact to electrically connect each of the plurality of printed traces in a single conductive path.

16. The anti-tamper mailing bag of claim 15, further comprising monitoring electronics electrically connected to at least one of the printed traces.

17. The anti-tamper mailing bag of claim 16, wherein at least some components of the monitoring electronics are printed onto the substrate or the first flap.

18. The anti-tamper mailing bag of claim 16, wherein the adhesive comprises a conductive adhesive disposed on the first conductive contacts or on the second conductive contacts.

19. The anti-tamper mailing bag of claim 18, wherein the conductive adhesive is disposed on both the first conductive contacts and the second conductive contacts.

20. The anti-tamper mailing bag of claim 1, wherein the monitoring electronics are further configured to:

cause encryption of the signature of the electrical shield based on an encryption key prior to storing the signature, wherein the stored signature is the encrypted signature; and cause a decryption key corresponding to the encryption key to be sent to a computing device associated with a recipient of the mailing bag.

\* \* \* \* \*